Fig. 1.

No. 760,082. PATENTED MAY 17, 1904.
J. R. SCOTT.
BLANK FEEDING MECHANISM.
APPLICATION FILED JUNE 16, 1902.
NO MODEL. 6 SHEETS—SHEET 4.

Fig. 4.

Witnesses
Edward S Day
Christiana Kitching

Inventor
Jacob R. Scott
By his Attorneys
Phillips Van Lauren & Fish

No. 760,082. PATENTED MAY 17, 1904.
J. R. SCOTT.
BLANK FEEDING MECHANISM.
APPLICATION FILED JUNE 16, 1902.
NO MODEL. 6 SHEETS—SHEET 5.

Witnesses
Edward S. Day
Christiana Kitching

Inventor
Jacob R. Scott
by his Attorneys
Phillips Van Everen & Fish

No. 760,082. PATENTED MAY 17, 1904.
J. R. SCOTT.
BLANK FEEDING MECHANISM.
APPLICATION FILED JUNE 16, 1902.
NO MODEL. 6 SHEETS—SHEET 6.

Witnesses
Edward S. Day
Christiane Kitching

Inventor
Jacob R. Scott
by his Attorneys
Phillips Van Everen & Fish

No. 760,082.

Patented May 17, 1904.

UNITED STATES PATENT OFFICE.

JACOB R. SCOTT, OF BOSTON, MASSACHUSETTS, ASSIGNOR TO UNITED SHOE MACHINERY COMPANY, OF PATERSON, NEW JERSEY, A CORPORATION OF NEW JERSEY.

BLANK-FEEDING MECHANISM.

SPECIFICATION forming part of Letters Patent No. 760,082, dated May 17, 1904.

Application filed June 16, 1902. Serial No. 111,854. (No model.)

*To all whom it may concern:*

Be it known that I, JACOB R. SCOTT, a citizen of the United States, residing at Boston, in the county of Suffolk and State of Massachusetts, have invented certain new and useful Improvements in Blank-Feeding Mechanisms; and I do hereby declare the following to be a full, clear, and exact description of the invention, such as will enable others skilled in the art to which it appertains to make and use the same.

The present invention relates to blank-feeding mechanism, and more particularly to a blank-feeding mechanism for use in machines for skiving articles of leather, such as boot or shoe counters, box-toe pieces, and the like.

Among the objects of my invention are to provide an improved means for acting upon a pile of blanks in a hopper to maintain the blanks in position to be fed from the hopper, and thereby render the machine in which the blank-feeding mechanism is used more certain and reliable in operation; to provide improved means for supporting the pile of blanks and for feeding the blanks from the hopper, whereby the blank-feeding mechanism can be used to feed blanks of different thicknesses with certainty and the machine in which it is used is rendered capable of operating successfully upon different grades and classes of work, and in general to improve the construction, arrangement, and mode of operation of the various parts of blank-feeding mechanisms.

With these objects in view my invention contemplates providing a blank-feeding mechanism comprising a hopper and a follower for acting upon a pile of blanks in the hopper, with means for holding the follower out of contact with the pile of blanks, and with means under the control of the operator for releasing the follower and allowing it to move into contact with the pile of blanks. The follower is thus brought into contact with the pile with considerable force and acts to immediately press the blanks out flat in condition to be fed from the hopper.

My invention also contemplates providing means for actuating the follower after it is thus brought into contact with the pile of blanks to maintain the pile of blanks in proper position as the blanks are fed from the hopper and for actuating the follower in a direction to allow a supply of blanks to be placed in the hopper. In the illustrated embodiment of my invention hereinafter described the same mechanism is utilized to actuate the follower in both directions, said mechanism being provided with reversing devices by means of which the direction of movement imparted to the follower can be changed. It is to be understood, however, that my invention, except as defined in the claims, is not limited to a construction in which the same mechanism is utilized to actuate the follower in both directions. It is also to be understood that certain features of my invention are not limited to a construction comprising a mechanism for actuating the follower in both directions and that as to its broader aspects it may be embodied in a construction in which no mechanism is provided for actuating the follower in either direction.

In carrying out my invention I have provided, in connection with the means for releasing and actuating the follower above referred to, mechanism for feeding the blanks from the hopper, and in order to prevent such feeding mechanism from acting upon the blanks until after they have been pressed into proper position by the follower I have provided means under the control of the operator for throwing the feeding mechanism into operation after the follower is released.

To provide a blank-feeding mechanism which can be used to feed blanks of different thicknesses with certainty, my invention contemplates providing means for supporting a pile of blanks in a hopper above the level of the feed-table over which the blanks are fed from the hopper, said means being removable, so that the pile of blanks can be supported either directly upon the feed-table or above the level of the feed-table, as desired. By providing such removable means for supporting a pile of blanks the feeding mechanism can be easily and quickly adapted for operation upon blanks of different thicknesses without the necessity of adjusting the guards which confine the blanks in the hopper and which act to prevent more than one blank from being fed from the hopper at a time. In the illustrated embodiment of my invention the removable means for supporting the pile of blanks consists of a removable filling-plate, which is secured in position above the feed-table. The mechanism for feeding the blanks from the hopper consists of a feed-plate, which is removably secured to a reciprocating carrier, and the provision of the removable filling-plate enables me to use feed-slides of different thicknesses, and thereby insure the engagement of but a single blank by the feed-slide.

In addition to the features of invention above referred to my invention also consists in certain devices, combinations, and arrangement of parts hereinafter described and claimed, the advantages of which will be obvious to those skilled in the art.

My invention is intended, primarily, as an improvement on certain leather-skiving machines heretofore devised by me and forming the subject-matter of prior applications for Letters Patent.

The particular machine to which the illustrated embodiment of my invention has been applied is similar in the construction, arrangement, and mode of operation of many of its parts to the machine disclosed in my prior application, Serial No. 77,730, filed October 5, 1901, the construction, arrangement, and mode of operation of the die-roller and pressure device being, however, similar to the corresponding parts disclosed in my prior application, Serial No. 49,158, filed February 7, 1901. Since the construction and arrangement of the various parts of the machine are illustrated in the drawings accompanying this application, they will be described herein, reference being made, however, to said applications for a complete disclosure of the advantages secured thereby.

Referring now to the drawings, in which is illustrated a skiving-machine adapted for skiving either counters or box-toe pieces embodying the preferred form of my invention.

1 indicates a suitable hollow case or standard upon which the frame of the machine is supported. The frame of the machine consists of a base-plate 2, which rests upon the upper end of the standard 1 and is secured thereto by the bolts 3, side plates 4 and 5, cross-webs 6 and 7, connecting the side plates 4 and 5, and a yoke-shaped casting 8, bolted to the side plates at the delivery end of the machine and extending upward and inward over the center of the machine. A driving-shaft 9 is mounted in bearings in the lower portion of the frame and is provided at one end with a hand-wheel 10 and at the other end with fast and loose driving-pulleys 11 and 12 and with a pinion 13, from which the moving parts of the machine are driven, as will be hereinafter described.

Figures 7, 8, 10, 11, 12, 13:
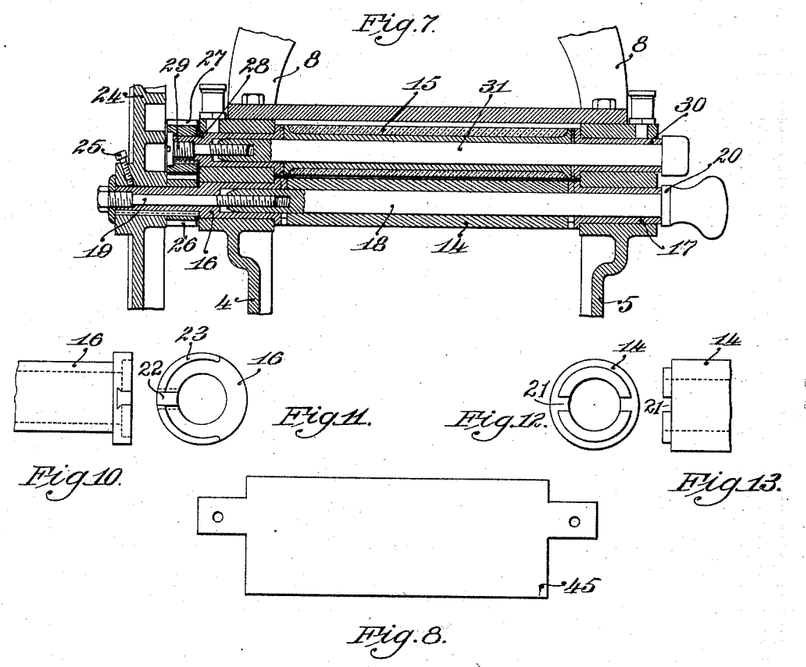
Fig. 7 is a detail sectional view on the line 7 7 of Fig. 4, illustrating the construction by which the pressure and die rolls are removably mounted.
Fig. 8 is a plan view of the filler-plate.
Fig. 10 is a view in side elevation of one end of one of the sleeves at the end of the die-roll.
Fig. 11 is an end view thereof.
Fig. 12 is an end view of the die-roll.
Fig. 13 is a view in side elevation of one end thereof.

14 indicates the die-roller, and 15 the pressure-roller, said rolls being removably mounted in the upper portion of the side plates 4 and 5 of the frame of the machine, as is clearly shown in Fig. 7. Referring to this figure, 16 designates a short shaft journaled in a bearing formed in the upper portion of the side plate 4 at one end of the die-roller, and 17 designates a sleeve journaled in a bearing formed in the upper portion of the side plate 5 at the other end of the die-roller. The inner end of the shaft 16 is bored axially, so that the inner end of the shaft in effect constitutes a sleeve. The sleeve 17 and the sleeve formed by the inner end of the shaft 16 are provided with radial flanges, and between the flanges the die-roller is supported by means of the shaft 18, which passes through the sleeve 17 and through the die-roller and extends into the sleeve at the inner end of the shaft 16. A rod 19 passes axially through the shaft 16 and extends into the sleeve at the inner end of the shaft, said rod being provided with a screw-threaded portion having a screw-threaded engagement with the shaft 16, whereby the rod is firmly secured to the shaft. The end of the rod 19 which extends into the sleeve at the inner end of the shaft 16 is also screw-threaded, and the shaft 18 has a screw-threaded engagement with this portion of the rod. At its outer end the shaft 18 is provided with a flange 20, which bears against the outer end of the sleeve 17, so that by rotating the shaft in one direction the sleeve 17 is forced against the die-roller 14 and the die-roller against the sleeve at the inner end of shaft 16, and these parts are securely locked together. By rotating the shaft 18 in the opposite direction the shaft can be withdrawn and the die-roller removed. To insure the rotation of the die-roller with the shaft 16 and the rotation of the sleeve 17 with the die-roller, the ends of the die-roller are provided with slots 21, which are engaged by projections 22 on the inner ends of the sleeve 17 and shaft 16. The ends of the die-roller are reduced in size, and the inner ends of the sleeve 17 and shaft 16 are provided with semicircular flanges 23, as is clearly shown in Figs. 10 and 11, which partially surround the reduced ends of the die-roller, whereby the placing of the die-roller in position in the machine is facilitated and the die-roller is prevented from dropping out of the machine when the shaft 18 is removed, except when the shaft 16 and the die-roller are in a certain position. To the outer end of the shaft 16 a large gear-wheel 24 is secured by means of a set-screw 25. The gear-wheel 24 is keyed to the shaft 16, and also keyed to said shaft between the gear 24 and the bearing for the shaft is a pinion 26, which meshes with a pinion 27, secured to the outer end of a short shaft 28, journaled in a bearing formed in an upwardly-extending portion of the side plate 4. The pinion 27 is secured to the shaft 28 by means of a screw-threaded rod 29, which has a screw-threaded engagement with the shaft 28 and extends axially thereof. The inner end of the shaft 28 is bored axially to form a sleeve and is provided with a radial flange in the same manner as the shaft 16. A sleeve 30, provided with a flange at its inner end, is journaled above the sleeve 17 in a bearing formed in the upwardly-extending portion of the side plate 5, and between the inner ends of the shaft 28 and the sleeve 30 the pressure-roller 15 is supported by means of a shaft 31. The shaft 31 extends through the sleeve 30, the pressure-roller 15, and into the sleeve at the inner end of the shaft 28 and at its inner end has a screw-threaded engagement with the rod 29, which extends into the sleeve. The pressure-roller is thus removably supported in the same manner as the die-roller. To cause the shaft 28, the pressure-roller 15, and the sleeve 30 to rotate in unison, the inner ends of the shaft 28 and sleeve 30 are provided with projections which engage slots in the ends of the pressure-roller. The gear-wheel 24 meshes with the pinion 13 on the driving-shaft, and thus the die-roller and pressure-roller are rotated continuously so long as the driving-belt remains on the fast pulley 11.

The skiving-knife is indicated at 32 and is secured to the upper surface of the cross-web 7 by means of screws 33, passing through slots in the knife. Screws 34, provided with enlarged portions which move in slots in the cross-web 7 and extend above the surface of the cross-web in position to engage the rear edge of the knife, serve as a means for adjusting the position of the knife or as stops for insuring the correct position of the knife when it is replaced after removal.

Figure 1:
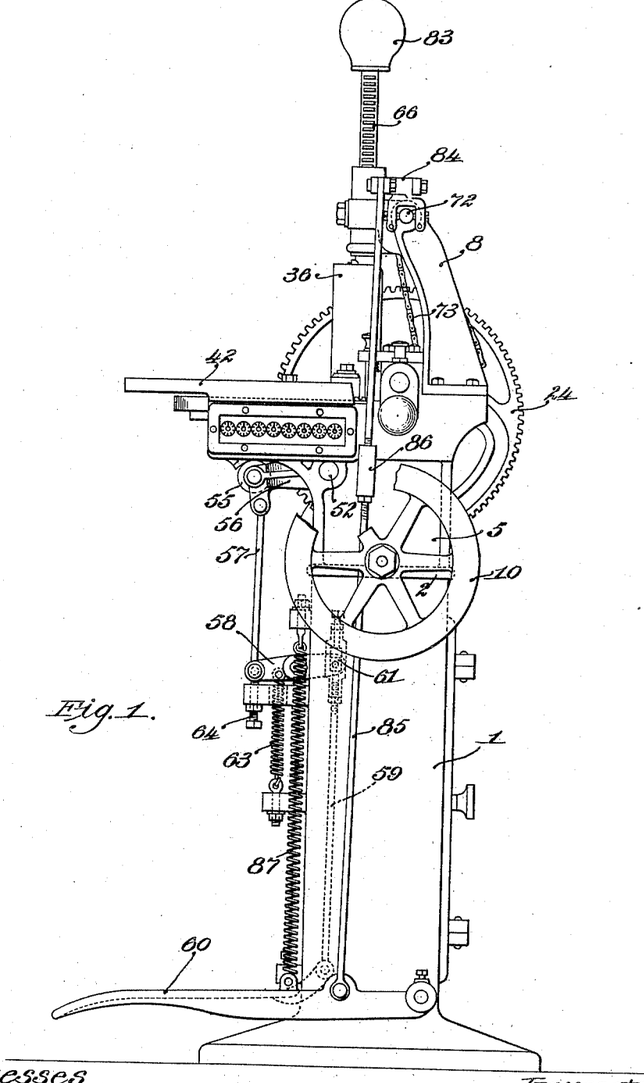
Figure 1 is a view in side elevation of the machine.
Figure 2:
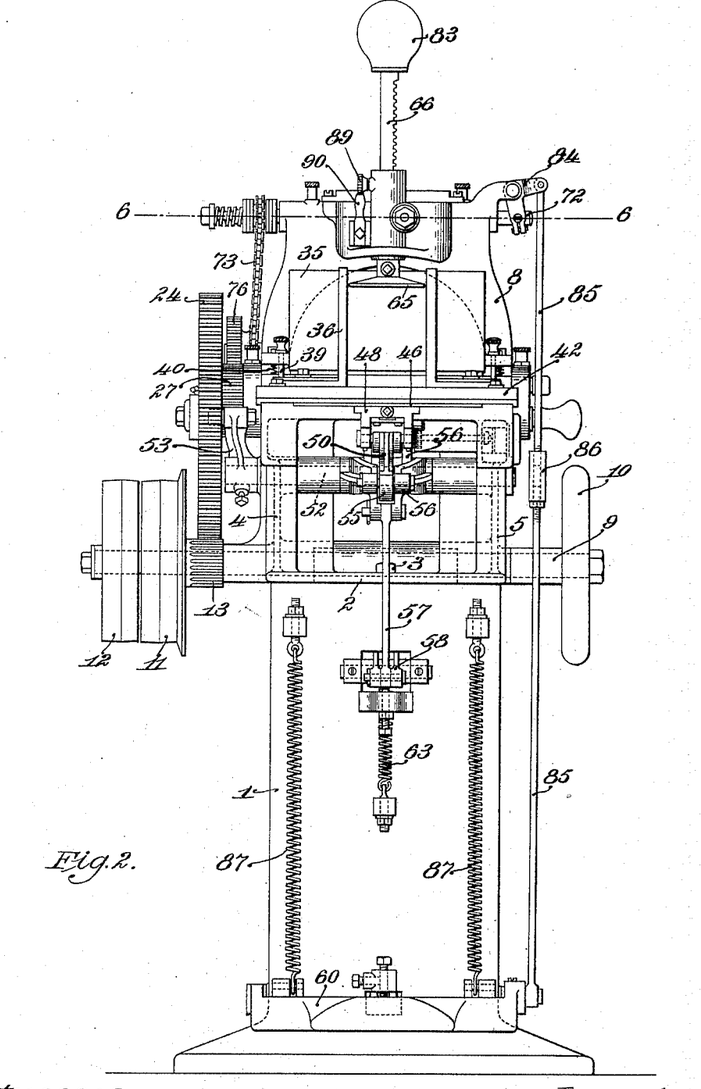
Fig. 2 is a view in front elevation.
Figure 3:
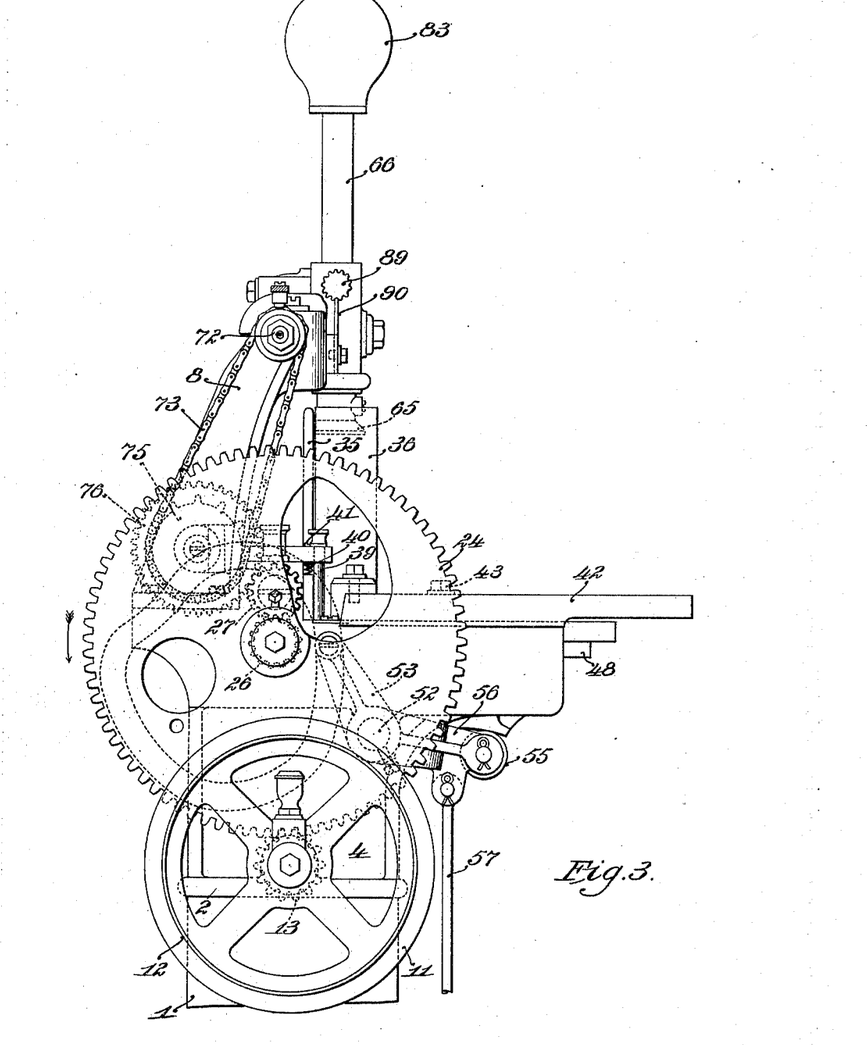
Fig. 3 is a view in side elevation of the upper portion of the machine looking in the opposite direction from Fig. 1, a portion of the large gear being broken away to show underlying parts.

A feed-table for supporting a pile of blanks in position to be fed to the die and pressure rollers is formed by the cross-web 6, which is located on the opposite side of the die and pressure rollers from the skiving-knife. Above the feed-table is a hopper for the pile of blanks, which comprises a front wall 35 and side walls 36. The front wall is supported by means of a flange 37, projecting from the front wall over the pressure-roller and bolted upon the upwardly-extending portions of the side plates 4 and 5, in which the shaft 28 and sleeve 30 are journaled. Located below the front wall 35 and forming a continuation thereof is a vertical movable plate 38, the lower surface of which is provided with a beveled portion to allow the lowermost blank of the pile to be fed beneath the plate to the die and pressure rollers. This plate rests upon the blank as it is fed to the die and pressure rollers and acts to hold the blank down in contact with the feed-table. The plate also acts as a guard to prevent the passage of more than one blank at a time from the hopper. The ends of the plate are guided between the upwardly-extending portions of the side plates 4 and 5 and vertical pins 39, which pass downward through lugs extending from the flange 37 of the front wall of the hopper. The plate is yieldingly pressed toward the feed-table by means of coiled springs 40, (see more particularly Figs. 2 and 3,) and the upward movement of the plate is limited by adjustable stop-screws 41, whereby the plate is positively prevented from rising high enough to permit the passage of more than one blank thereunder. The rear of the hopper is open, and in order to prevent the blanks at the bottom of the pile from being displaced backwardly a guard-plate 42 is provided, which is secured upon the upper edges of the side plates 4 and 5 by means of screws 43, which pass through slots in the plate. At its forward edge the guard-plate extends downwardly into a position to positively prevent the lowermost blank in the hopper from being displaced backwardly. This guard-plate also serves as a table to support the blanks preparatory to their being placed in the hopper. The means for securing the plate to the side plates 4 and 5 enables the plate to be adjusted toward and from the guard-plate 38 at the front of the hopper to allow blanks of different widths to be placed in the hopper. The side walls 36 are mounted upon the guard-plate 42 and are secured thereto by means of screws 44, which pass through slots in lugs projecting horizontally from the side walls. The side walls of the hopper are thus moved with the guard-plate 42 as it is adjusted toward and from the guard-plate 38 at the front of the hopper. The machine illustrated in the drawings is designed for skiving counters or box-toe pieces, and the die-cavity of the die-roller is so arranged that the blanks are fed to the die and pressure rollers sidewise with the edge of the counter which is uppermost in the completed shoe and which is more rounded than the lower edge or the rounded edge of the box-toe piece in advance. The inner surfaces of the side walls 36 are plane, and by mounting these walls upon the guard-plate 42 no opening is left between the front edge of the guard-plate and the side walls when the guard-plate is adjusted, and thereby a wide range of adjustment is allowed. The forward edge of the guard-plate 42 is provided with a scale graduated in opposite directions from the center to serve as a guide in adjusting the side plates 36.

As has been stated, the machine illustrated in the drawings is designed for skiving either counters or box-toe pieces. The blanks for box-toe pieces are usually thinner than the blanks for counters, and in order to adapt the machine for operation upon either kind of blanks or upon counter-blanks or box-toe-piece blanks of different thicknesses I have provided removable means for supporting the pile of blanks above the level of the feed-table, such means, as shown in the drawings, consisting of a filling-plate 45. (Shown separately in Fig. 8.) This plate when in position rests upon the upper surface of the feed-table 6 and is secured by means of screws passing through ears projecting from the ends of the plate into the side plates 4 and 5 of the machine-frame. When this plate is in position, the lowermost blank of the pile is supported above the level of the feed-table, and a thin blank can be fed beneath the front guard 38 to the die and pressure rollers, the blank next to the bottom blank being held in position by the front guard, so that it is prevented from being fed forward with the bottom blank and after the bottom blank has been fed from the hopper is prevented from being displaced backwardly by the guard-plate 42 at the rear of the hopper. The machine is thus adapted for operation upon thin blanks without any adjustment of the guard-plates 38 and 42. When thick blanks are to be operated upon, the filling-plate 45 is removed and the bottom blank of the pile rests directly upon the upper surface of the feed-table.

Figure 9:
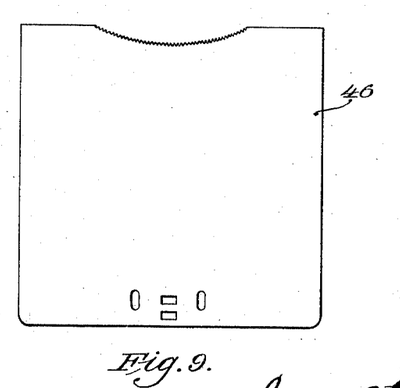
Fig. 9 is a plan view of a feed-plate.

The blanks are fed from the hopper by means of a feed-slide 46, which is removably secured to a reciprocating carrier, several of these feed-slides being provided for use with blanks of different thicknesses. A feed-slide is shown separately in Fig. 9. The feed-slide extends beyond the hopper at each side, and its forward edge is shaped to fit the rear edge of the blanks and is provided with serrations to more effectually prevent the blanks from being displaced while being fed beneath the front wall of the hopper. The feed-slide is adjustably secured, by means of screws 47 passing through slots in the slide, to a reciprocating carriage consisting of a block 48, mounted in guideways in the machine-frame beneath the guard-plate 42. A screw 49, having a screw-threaded engagement with the block 48 and provided with two flanges, one of which engages a slot in the feed-slide and the other of which engages the rear edge of the feed-slide, serves as a convenient means for adjusting the slide on the block. As shown in the drawings, the feed-slide is provided with two slots, which may be engaged by the flanges of the screw 49 when a considerable change is made in the adjustment of the feed-slide. The block 48 is reciprocated by means of a link 50, which connects the block with a yoke 51, secured to a rock-shaft 52, journaled in the side plates 4 and 5 of the machine-frame, said rock-shaft being provided with an arm 53, which carries a roll engaging a cam-groove cut in the inner face of the large gear-wheel 24.

Figure 4:
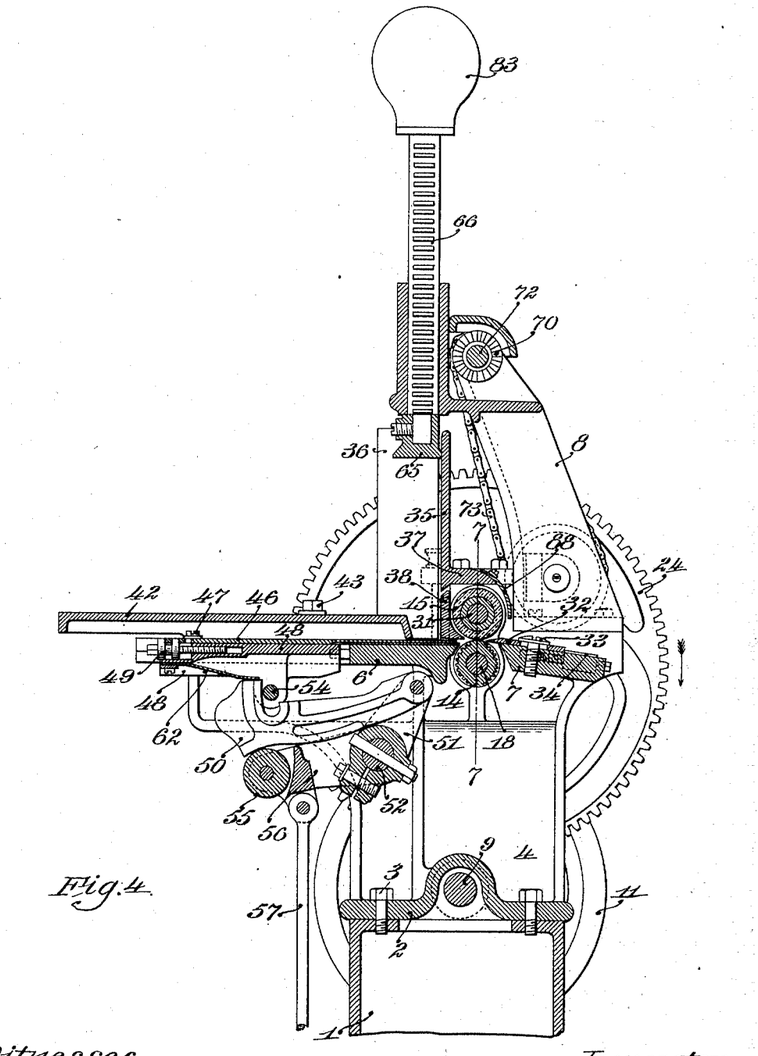
Fig. 4 is a vertical longitudinal section of the upper portion of the machine.

The feed-slide 46 reciprocates over the feed-table and beneath the guard-plates 42 and 38 in feeding blanks from the hopper, and when the filling-plate 45 is employed to support the pile of blanks a feed-slide is provided, the under surface of which is cut away, as is clearly shown in Fig. 4, to form a recess to receive the filling-plate.

Figure 5:
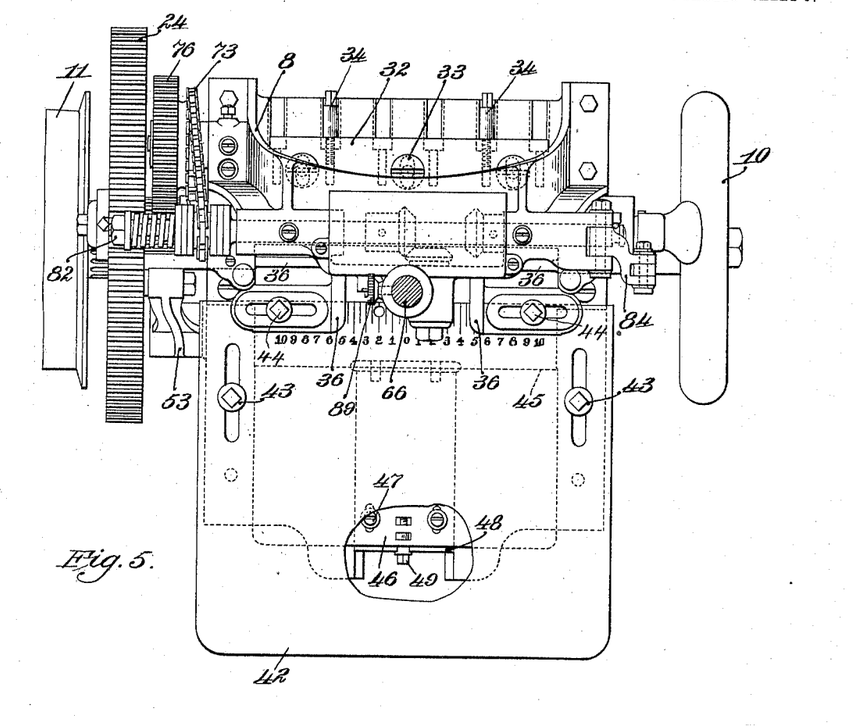
Fig. 5 is a plan view, a portion of the guard-plate at the rear of the hopper being broken away to show the connection between the feed-slide and its reciprocating carrier and the rod to which the follower is secured being shown in section.

In the machine shown in the drawings means are provided for throwing the feeding mechanism out of operation during the operation of the machine, whereby the jar and strain on the parts incident to stopping and starting the entire machine are avoided and the operation of the machine is readily and quickly controlled by the operator. This result is accomplished by disconnecting the block 48 from the link 50. In order to allow the block to be disconnected, the connections between these parts consist of a pin 54, extending between lugs projecting downwardly from the block 48, and an open-ended slot in the upper side of link 50. The rear wall of this slot extends above the front wall, and a controller for the link, consisting of the roll 55, is arranged to allow the link to fall sufficiently to remove the front wall of the slot from engagement with the pin, but not the rear wall. The link 50 rests upon and slides over the roll 55, which is journaled between the arms of a yoke 56, loosely pivoted on the shaft 52 and connected by means of a rod 57 to one end of a lever 58, pivotally mounted upon the standard 1. The other end of the lever 58 is connected by means of a rod 59 to a foot-treadle 60, pivotally supported at the base of the standard 1. The connection between the rod 59 and the lever 58 is such as to allow lost motion between these parts for a purpose to be hereinafter explained, such connection consisting of a block 61, pivotally mounted upon the end of the lever and being received in a slot in a block with which the upper end of the rod has a screw-threaded engagement. The connections between the roll 55 and the treadle 60 are such that during the first portion of the downward movement of the treadle the roll remains stationary, and thereafter the roll is raised to press the link 50 against the pin 54. The roll 55 is normally held in its lowest position by means of a leaf-spring 62, secured to the block 48 and bearing against the end of the link, as shown in Fig. 4, and by a coiled spring 63, connected at one end to the lever 58 and at its other end to a bolt adjustably secured in a lug on the standard 1. The normal position of the roll 55 is determined by an adjustable stop-screw 64, projecting upwardly through a lug on the standard 1 into the path of movement of the outer end of the lever 58. It will be seen that the feed-slide will be disconnected from its actuating mechanism when in its extreme forward position, the link 50 remaining in engagement with the pin 54 during its forward movement after the roll 55 has been lowered and passing beneath the pin during its backward movement. Preferably the forward end of the block 48 is provided with buffers, of leather or other suitable material, as shown in Figs. 4 and 5, to contact with the cross-web 6 when the block is brought forward after the link 50 has been lowered.

Figure 6:
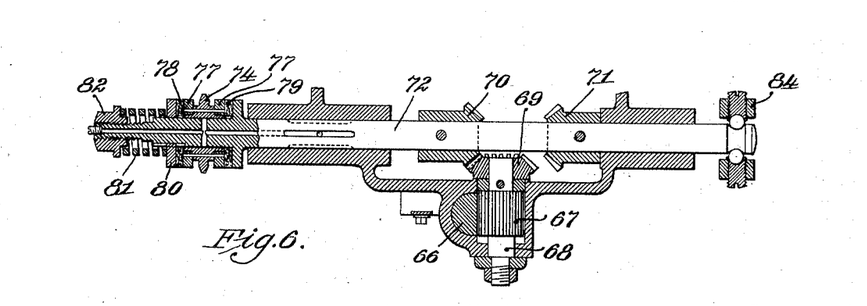
Fig. 6 is a detail sectional plan view on the line 6 6 of Fig. 2.

The follower for acting upon the pile of blanks in the hopper is indicated at 65 and is secured by means of a set-screw to the lower end of a rod 66, mounted to slide in a guideway formed in the upper portion of the yoke 8 of the frame. This rod is provided with a series of rack-teeth which mesh with the teeth of a pinion 67, secured to or formed integral with a short shaft 68, journaled in the yoke 8 of the frame, as is clearly shown in Fig. 6. To the end of the shaft 68 is secured a beveled gear 69, with which either of two oppositely-disposed beveled gears 70 and 71, secured to a shaft 72, is arranged to engage. The shaft 72 is arranged to rotate and slide in bearings in the yoke 8 of the frame and is rotated by means of a sprocket-chain 73, which passes over a sprocket-wheel 74, frictionally mounted upon the shaft 72, and over a sprocket-wheel 75, secured to a short shaft journaled in a bearing formed on one side of the yoke 8. To this shaft is also secured a gear-wheel 76, which meshes with the pinion 27, secured to the shaft 28, which actuates the pressure-roll, so that the sprocket-wheel 74 on the shaft 72 is driven continuously in the same direction so long as the driving-belt remains upon the fast pulley 11. The sprocket-wheel 74 is provided with a disk 77 at each side, secured thereto by pins passing through the disks and the hub of the sprocket-wheel, and is mounted between two friction-disks 78 and 79, the disk 79 being secured to a flange on the shaft and the disk 78 being secured to a disk 80, splined on the shaft, so as to rotate therewith but to be capable of moving longitudinally thereon. A coiled spring 81 surrounds the shaft and is interposed between the disk 80 and a nut 82, having a screw-threaded engagement with the end of the shaft. The spring 81 presses the disk 80 and the friction-disk 78, secured thereto, against one of the disks 77, secured to the ratchet-wheel, and the other disk 77 against the friction-disk 79, the amount of friction depending upon the adjustment of the nut 82. As a means for lubricating the bearing of the shaft 72 adjacent the sprocket-wheel 74 and for lubricating the bearing of the sprocket-wheel the shaft is provided with a series of shallow grooves for containing the lubricating-oil, and the end of the shaft is bored axially to form an oil-receptacle, which communicates with one or more of these grooves and with the bearing-surface of the sprocket-wheel.

The upper end of the rod 66, to which the follower 65 is secured, is provided with a weight 83, and the arrangement of the beveled gears 69, 70, and 71 is such that when the gear 70 is in engagement with gear 69 the follower is held in its highest position out of contact with the pile of blanks, the frictional connection between the sprocket-wheel 74 and the shaft 72 being sufficient to raise the follower to such position and hold it raised. A movement of the shaft 72 to the left as viewed in Fig. 6 disengages the gear 70 from the gear 69 before the gear 71 is engaged with the gear 69. Such movement of the shaft 73 therefore releases the follower, which immediately drops upon the pile of blanks, being forcibly brought into contact therewith by the action of the weight 83. The blanks in the pile are thus compressed and flattened out and can be fed successively from the bottom of the pile with certainty. The shaft 72 is moved to the left as viewed in Fig. 6 by means of connections to the foot-treadle 60, and these connections are such that the shaft is moved to release the follower before the feeding mechanism is thrown into operation and is not moved a sufficient distance to bring the gear 71 into engagement with the gear 69 until after the feeding mechanism has been thrown into operation. After the gear 71 engages the gear 69 the follower is actuated in a direction to maintain the blanks in position to be fed from the follower as the blanks are successively removed from the bottom of the pile. The connections between the shaft 72 and the treadle 60 for moving the shaft comprise a bell-crank lever 84, pivoted to the yoke 8 at one end of the shaft 72, the vertical arm of the bell-crank being forked to receive the end of the shaft 72 and being connected thereto, so as to move the shaft longitudinally, while permitting it to rotate by balls which engage a groove in the end of the shaft and are seated in recesses at the inner ends of screws passing through the sides of the fork.

The horizontal arm of the bell-crank is connected, by means of a rod 85, provided with an adjustable turnbuckle 86, to the treadle 60. The treadle 60 is normally held in its raised position by means of coiled springs 87, connected at their lower ends to the treadle and at their upper ends to bolts adjustably secured in lugs projecting from the standard 1. When the treadle 60 is depressed, the shaft 72 is moved to the left through the connections above described a sufficient distance to disengage the gear 70 from the gear 69, and thereby release the follower, such movement not being sufficient to bring the gear 71 into engagement with the gear 69 and taking place before the roller 55, which controls the position of the link 50, is raised. During the continued downward movement of the treadle 60 the link 50 is raised through the connections hereinbefore described and that portion of the link between the slot in the link and the pivotal connection of the link with the yoke 51 is brought into engagement with the pin 54. The pin 54 thus forms a stop which through the connections to the treadle for raising the link prevents the further downward movement of the treadle and the continued movement of the shaft 72 to the left to bring the gear 71 into engagement with the gear 69. As soon, however, as the slot in the link 50 comes beneath the pin 54 the treadle is allowed to move downward, the link is raised into engagement with the pin 54, so as to actuate the feed-slide, and the shaft 72 is moved to bring the gear 71 into engagement with the gear 69. When it is desired to stop the operation of the feeding mechanism, the treadle 60 is allowed to rise, and during its upward movement the link 50 is allowed to drop to throw the feeding mechanism out of operation, and the shaft 72 is moved to bring the gear 70 into engagement with the gear 69, so that the follower is at once raised to its highest position to allow the hopper to be supplied with blanks.

The operation of the machine will be readily understood from the preceding description, and further description thereof is considered unnecessary. It may be stated, however, that, as in the machines disclosed in my prior applications hereinbefore referred to, the die-roller is provided with two die-cavities, either of which may be brought into coöperative relation with the feeding mechanism by placing the die-roller in the machine in the required position. The die-cavities are arranged on the die-roller with their greatest length extending longitudinally of the roller. Also the mechanism for actuating the feed-slide is arranged to impart to the blank during the first portion of its movement a speed greater than the peripheral speed of the die-roller, whereby the blank is bent into the cavity of the die-roller. Also the feed-slide remains in contact with the blank throughout substantially its entire passage through the die and pressure rollers, whereby any displacement of the blank is effectually prevented. In order to prevent the shavings removed from the blank from passing backward over the pressure-roller, a curved plate 88 is secured to the flange 37 of the front wall of the hopper and extends downward over the pressure-roller. This plate is removably secured to the flange 37, so that the pressure-roller can be readily removed after the plate 88 is removed without disturbing the front wall of the hopper. The follower can be locked in any desired position by means of a locking-screw 89, passing through the bearing for the rod 66 and pressing against the rod. The head of this screw is provided with teeth, which are engaged by a leaf-spring 90, which serves as a means for locking the screw.

Having thus described my invention, I claim as new and desire to secure by Letters Patent of the United States—

1. A blank-feeding mechanism, having, in combination, a hopper, a follower acting on a pile of blanks in the hopper, feeding mechanism for feeding the blanks from the pile, mechanism for actuating the follower to maintain the pile of blanks in proper position with relation to the feeding mechanism, and means controlled by the operator for releasing the follower and allowing it to move into contact with the pile of blanks and for thereafter throwing the mechanism for actuating the follower and the feeding mechanism into operation, substantially as described.

2. A blank-feeding mechanism, having, in combination, a hopper, a follower acting on a pile of blanks in the hopper, feeding mechanism for feeding the blanks from the pile, mechanism for actuating the follower to maintain the pile of blanks in proper position with relation to the feeding mechanism and for actuating the follower in a direction to allow a supply of blanks to be placed in the hopper and means controlled by the operator for releasing the follower and allowing it to move into contact with the pile of blanks, for thereafter throwing the feeding mechanism and the mechanism for actuating the follower to maintain the pile of blanks in proper position with relation to the feeding mechanism into operation, for throwing the feeding mechanism out of operation and for throwing the mechanism for actuating the follower in a direction to allow a supply of blanks to be placed in the hopper into operation, substantially as described.

3. A blank-feeding mechanism, having, in combination, a hopper, a follower acting on a pile of blanks in the hopper, feeding mechanism for feeding blanks from the pile, mechanism for actuating the follower to maintain the pile of blanks in proper position with relation to the feeding mechanism, and means controlled by the operator for releasing the follower and allowing it to move into contact with the pile of blanks for thereafter throwing the feeding mechanism into operation and for throwing the feeding mechanism and mechanism for actuating the follower out of operation, substantially as described.

4. A blank-feeding mechanism, having, in combination, a hopper, a follower acting on a pile of blanks in the hopper, mechanism for actuating the follower to maintain the pile of blanks in proper position to be fed from the hopper, and means under the control of the operator for releasing the follower and allowing it to move into contact with the pile of blanks and for thereafter throwing the mechanism for actuating the follower into operation, substantially as described.

5. A blank-feeding mechanism, having, in combination, a feed-table, a hopper located above the feed-table, a weighted follower acting on a pile of blanks in the hopper, mechanism for actuating the follower to force the pile of blanks toward the feed-table, and means controlled by the operator for releasing the follower and allowing it to move into contact with the pile of blanks and for thereafter throwing the mechanism for actuating the follower into operation, substantially as described.

6. A blank-feeding mechanism, having, in combination, a hopper, a follower acting on a pile of blanks in the hopper, means for holding the follower out of contact with the pile of blanks, and means under the control of the operator for releasing the follower and allowing it to move into contact with the pile of blanks, substantially as described.

7. A blank-feeding mechanism, having, in combination, a hopper, a follower acting on a pile of blanks in the hopper, mechanism for actuating the follower in a direction to allow a new supply of blanks to be placed in the hopper, and means under the control of the operator for releasing the follower and allowing it to move into contact with the pile of blanks and for throwing the mechanism for actuating the follower into operation, substantially as described.

8. A blank-feeding mechanism, having, in combination, a hopper, a follower acting on a pile of blanks in the hopper, mechanism for actuating the follower to maintain the pile of blanks in proper position to be fed from the hopper and for actuating the follower to allow a new supply of blanks to be placed in the hopper, and means under the control of the operator for releasing the follower and allowing it to move into contact with the pile of blanks, for throwing the mechanism for actuating the follower into operation to actuate the follower to maintain the pile of blanks in proper position to be fed from the hopper, and for throwing said mechanism into operation to actuate the follower to allow a supply of blanks to be placed in the hopper, substantially as described.

9. A blank-feeding mechanism, having, in combination, a hopper, a follower acting on a pile of blanks in the hopper, feeding mechanism for feeding blanks from the pile, and means under the control of the operator for releasing the follower and allowing it to move into contact with the pile of blanks and for thereafter throwing the feeding mechanism into operation, substantially as described.

10. A blank-feeding mechanism, having, in combination, a feed-table, a hopper located above the feed-table, and removable means for supporting a pile of blanks above the level of the feed-table, substantially as described.

11. A blank-feeding mechanism, having, in combination, a feed-table, a hopper located above the feed-table, and a removable filling-plate for supporting a pile of blanks above the level of the feed-table, substantially as described.

12. A blank-feeding mechanism, having, in combination, a feed-table, a hopper located above the feed-table, a removable filling-plate for supporting the pile of blanks above the level of the feed-table, a reciprocating carrier, and a feed-slide removably secured thereto arranged to reciprocate over the filling-plate and feed the blanks from the hopper, substantially as described.

13. A blank-feeding mechanism, having, in combination, a feed-table, a hopper comprising a front wall and side walls, and a guard-plate at the rear of the hopper adjustable toward and from the front wall of the hopper upon which the side walls of the hopper are mounted so as to be adjustable toward and from each other, substantially as described.

14. A blank-feeding mechanism, having, in combination, a feed-table, a hopper comprising a front wall and side walls, and a guard-plate at the rear of the hopper adjustable toward and from the front wall of the hopper upon which the side walls of the hopper are mounted, substantially as described.

In testimony whereof I affix my signature in presence of two witnesses.

JACOB R. SCOTT.

Witnesses:
FRED O. FISH,
HORACE VAN EVEREN.